US007475924B2

(12) United States Patent
Meyer et al.

(10) Patent No.: US 7,475,924 B2
(45) Date of Patent: Jan. 13, 2009

(54) SUPPORT BRACKET FOR AN EXTERIOR HANDLE OF A VEHICLE DOOR FOR MOTOR VEHICLES

(75) Inventors: Dieter Meyer, Wolfsburg (DE); Bernd Orlow, Salzgitter-Thiede (DE); Renee Dau, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 208 days.

(21) Appl. No.: 11/371,774

(22) Filed: Mar. 9, 2006

(65) Prior Publication Data

US 2006/0219044 A1 Oct. 5, 2006

(30) Foreign Application Priority Data

Mar. 11, 2005 (DE) ....................... 10 2005 012 419

(51) Int. Cl.
*E05B 3/00* (2006.01)
*F16M 11/00* (2006.01)

(52) U.S. Cl. ............................ 292/336.3; 292/DIG. 53; 292/DIG. 54; 292/DIG. 65; 248/200; 74/502.4

(58) Field of Classification Search .............. 292/336.3, 292/DIG. 53, DIG. 54, DIG. 65; 248/200; 74/502.4
See application file for complete search history.

(56) References Cited

U.S. PATENT DOCUMENTS 4,762,349 A * 8/1988 Ikeda .......................... 292/216
4,861,081 A * 8/1989 Satoh ....................... 292/336.3
5,492,379 A * 2/1996 Staser et al. ............. 292/336.3
5,934,817 A * 8/1999 Kim et al. ..................... 403/196
7,210,715 B2 * 5/2007 Kobayashi et al. ....... 292/336.3
2003/0111849 A1 * 6/2003 Lee .......................... 292/336.3

FOREIGN PATENT DOCUMENTS

DE 198 08 375 A1 9/1999
DE 100 16 243 A1 10/2001
JP 54016053 A * 2/1979

* cited by examiner

*Primary Examiner*—Carlos Lugo
(74) *Attorney, Agent, or Firm*—Norris, McLaughlin & Marcus

(57) ABSTRACT

A support bracket for an exterior handle of a vehicle door for motor vehicles attaches inside an outer skin of a vehicle door for mounting the exterior handle in a handle recess of the outer skin. Both longitudinally extending ends of the support bracket include a first opening for passage of connecting elements of the exterior handle. A second opening supporting a closing cylinder is arranged following the first opening. A Bowden cable connection associated with the support bracket substantially in a region of the second opening supports the closing cylinder, and in a region of the first opening receives a connecting element of the exterior handle. The Bowden cable connection is releasably connected with a downwardly depending longitudinal side of the support bracket to provide safety in a crash.

10 Claims, 1 Drawing Sheet

SUPPORT BRACKET FOR AN EXTERIOR HANDLE OF A VEHICLE DOOR FOR MOTOR VEHICLES

The invention relates to a support bracket for an exterior handle of a vehicle door.

BACKGROUND

It is generally known that vehicle doors for motor vehicles are typically constructed of an outer skin and an interior lining, which together form the basic structure of the vehicle door. Based on this basic structure of the vehicle door, the door is finished by placing various components in the interior space formed by the exterior skin and the interior lining. These components include, for example, in addition to loudspeakers specifically the window panes with associated operating and guide elements, as well as the vehicle locks and the door handles, which are preferably located in form for an exterior handle in a handle recess disposed in the exterior skin of the vehicle door and operatively connected in the form of a closing cylinder with the vehicle lock.

Many different approaches are known for mounting the exterior handle and hence also the closing cylinder on the exterior skin of the vehicle door, as well as for positioning the exterior handle and the closing cylinder in the handle recess of the exterior skin of the vehicle door. These approaches are essentially always based on a basic component in the form of a support bracket, which is directly or indirectly attached to the inside of the outer skin of the vehicle door and thereby also to the handle recess. For example, a configuration for the exterior handle on the vehicle door is known wherein a support bracket is pre-mounted inside the outer skin of the vehicle door. A pull rod, which is separate from the exterior handle and pretensioned by a compression spring, operates on an actuating lever for the lock. A mounting plate assembly for the cylinder lock is also installed. With this configuration, the exterior handle and the closing cylinder can be installed at a later assembly stage, after the vehicle door is already closed, from the outside by way of a clip-on connection. One support end of the exterior handle hereby engages with the journal of the support bracket, whereas a coupling system is created between the pull rod and the exterior handle which enables the pull rod to move transversely relative to the exterior handle, so that the pull rod can be tightly guided in a guide opening.

In another conventional arrangement, which is also based on a support bracket disposed on the inside of the exterior skin of the vehicle door, the support bracket includes, in addition to a torsion spring, corresponding openings disposed on its longitudinal ends, with an additional opening arranged following a corresponding one of the openings. While the openings disposed on the longitudinal ends of the support bracket are provided for passage of the connecting elements of the exterior handle, the additional opening arranged following one of the two openings is provided for mounting the closing cylinder. Depending on the respective configuration or operation of the exterior handle, the support bracket may have on the side facing the opening provided for securing the closing cylinder a support fork which allows the exterior handle to pivot.

Regardless of the configuration of the support bracket attached to the inside of the exterior skin of the vehicle door and thereby also to the handle recess, and regardless of the way in which the closing cylinder is operatively connected to the exterior handle of the vehicle door, it has been observed that the lock-handle connections provided by the support bracket do not always provide the required safety in a crash, so that even a relatively small impact force can impair the operability of the lock-handle connections. Accordingly, even these small crash impact forces can endanger the vehicle occupants by rendering the lock-handle connections inoperable.

SUMMARY

It is therefore an object of the invention to provide a support bracket for an exterior handle of a vehicle door for motor vehicles, which improves the functional safety of the lock-handle connection in response to impact forces resulting from a crash, thereby essentially eliminating or at least reducing, the risk for the vehicle occupants caused by inoperability of the lock-handle connection.

This object is solved with the present invention by providing a novel support bracket The lock-handle connection includes an additional connection which enhances the operational safety when subjected to crash impact forces. This is achieved by associating a Bowden cable connection with the support bracket substantially in the region of the opening that supports the closing cylinder, as well as in the region of the opening which is arranged following that opening and receives a connecting element of the exterior handle. The Bowden cable connection is releasably connected with the downwardly depending longitudinal side of the support bracket. This approach essentially eliminates, or at least significantly reduces the risk for the vehicle occupants by retaining the functionality of the lock-handle connection.

According to an advantageous embodiment of the invention, the Bowden cable connection is preferably constructed of a T-shaped profile. One end of the Bowden cable is connected to the rib of the T-shaped profile, whereas both ends of the flange of the T-shaped profile include respective recesses for attaching the Bowden cable connection to the support bracket. The support bracket includes bearing journals for attaching the Bowden cable connection, which are arranged on the downwardly depending longitudinal sides of the support bracket.

The Bowden cable connection can be attached to the support bracket by way of the bearing journals by designing one side of the recesses disposed on the two ends of the flange of the T-shaped profile of the Bowden cable connection to be open to the outside. Based on this configuration of the recesses, the connection between the Bowden cable connection and the support bracket can be made crash-safe by arranging the recesses inside the flange of the T-shaped profile in such a way that one of the recesses extends at an angle of 90° with respect to the longitudinal direction of the flange of the T-shaped profile, whereas the second recess is oriented in the direction of the flange and is open to the outside exterior to the cross-section occupied by the bearing journal of the support bracket in the second recess. The Bowden cable connection is hereby attached to the support bracket by a clip-on connection by initially hooking the flange of the T-shaped profile of the Bowden cable connection in the corresponding bearing journal of the support bracket by way of the recess that is oriented in the direction of the flange, whereafter the recess which is oriented at 90° with respect to the longitudinal direction of the flange of the T-shaped profile is clipped on (by pressing) in the corresponding bearing journal of the support bracket.

According to another feature of the invention, a gap is formed between the flange of the T-shaped profile of the Bowden cable connection and the rib of the T-shaped profile, with the gap creating a discontinuity and a height offset to match the exterior contour of the support bracket. The opposing ends of the flange which are separated by the gap each have a pivot adapted to pivotally receive a connecting element that connects to the second end of the Bowden cable. The connecting element, which is pivotally connected to the Bowden cable, includes on its top side a recess which pivotally receives the leg of a frame. The frame is operatively connected to the support bracket and hence also with the exterior handle located in the handle recess of the exterior skin of the vehicle door. The frame, which is pivotally received by the connecting element, is likewise pivotally connected with the support bracket via the journals and bearings provided in the support bracket. This pivoting connection is preferably established in the region of the opening provided for passage of the connecting elements of the exterior handle. The opening provided for supporting the cylinder lock is arranged following the former opening.

To simultaneously reduce the weight of the support bracket according to the invention, the support bracket may be made, for example, of plastic. Other connecting elements can also be made of plastic, as long as crash safety is taken into consideration.

With the disclosed configuration of the support bracket according to the invention, an additional Bowden cable may be used to operatively connect the support bracket and/or the cylinder lock with additional functional elements. For example, the additional Bowden cable may be used to operatively connect the cylinder lock with the internal lock mechanism.

Additional advantageous embodiments of the invention are recited as additional features in the dependent claims.

An exemplary embodiment of the invention will now be described in detail with reference to the corresponding drawings.

EMBODIMENTS

Figure 1:
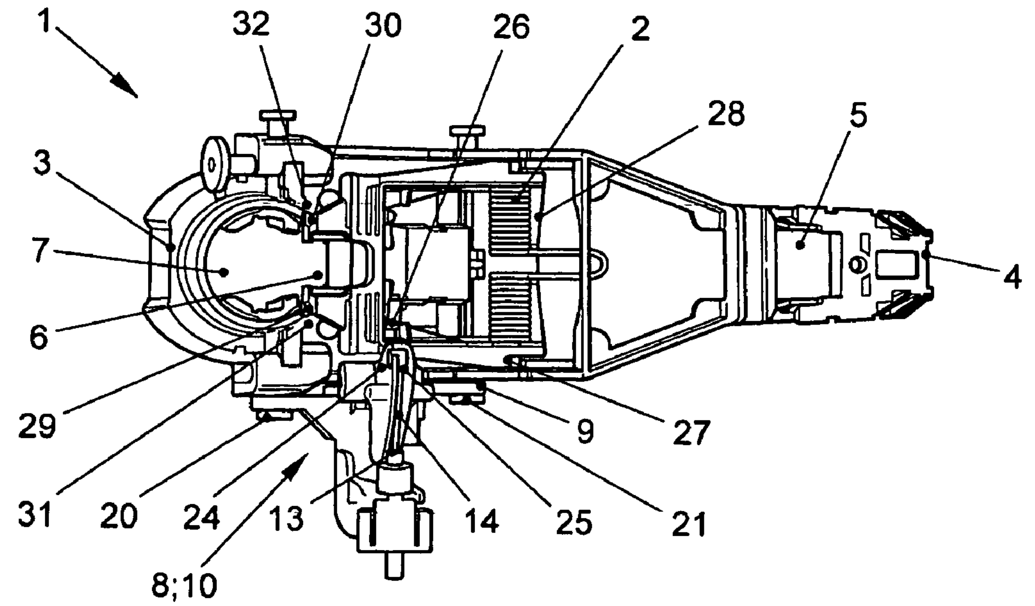
FIG. 1 is a perspective view of a support bracket for an exterior handle of a vehicle door for motor vehicles.

The support bracket 1 according to FIG. 1 is mounted on the inside of the exterior skin of a vehicle door (not shown) and provides a connection between a cylinder lock located in a handle recess of the outer skin of the vehicle door and an exterior handle (lock-handle connection). The support bracket 1 includes a torsion spring 2. In addition, the two longitudinally oriented ends 3, 4 of the support bracket 1 have corresponding openings 5, 6 for passage of connecting elements of the exterior handle. Another opening 7, which is wider than the opening 6 and provided for mounting the cylinder lock, is arranged next to the opening 6.

Figure 2:
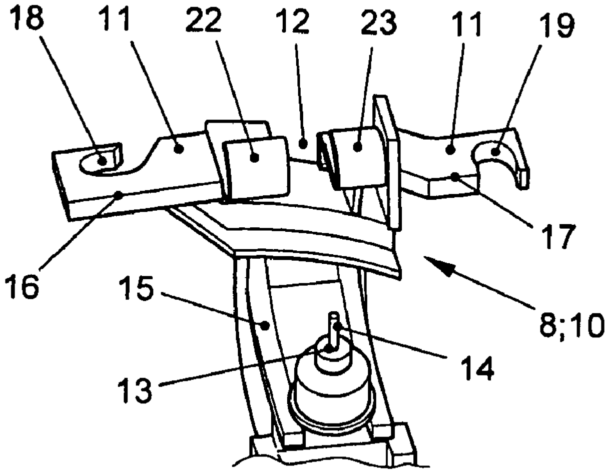
FIG. 2 is an enlarged perspective view the Bowden cable connection associated with the support bracket of FIG. 1.

Based on this design of the support bracket 1 with the lock-handle connection, the crash safety can be improved by associating a Bowden cable connection 8 with the support bracket 1 which is releasably connected with the downwardly depending longitudinal side 9 of the support bracket 1 so as to be safe in a crash. As seen in FIG. 2, the Bowden cable connection 8 consists essentially of a T-shaped profile 10. The flange 11 of the T-shaped profile 10 is disrupted by gap 12 and is offset in height relative to the rib 15 of the T-shaped profile 10 that receives one end 13 of a Bowden cable 14 so as to match the exterior contour of the support bracket 1. The two ends 16, 17 of flange 11 which are separated by gap 12 have respective recesses 18, 19 for clipping the T-shaped profile 10 on the support bracket 1. The recess 18 extends in the direction of flange 11 and is open to the outside on the exterior of a circular cross-section, whereas the recess 19, which is also open to the outside, is offset by 90° with respect to the longitudinal direction of the flange 11 of the T-shaped profile 10. As a result, the Bowden cable connection 8 can be hooked first, by way of recess 18, to a first bearing journal 20 arranged on the downwardly depending longitudinal side 9 of the support bracket 1. The Bowden cable connection 8 can then be connected, by way of recess 19, with the support bracket 1 by pressing the Bowden cable connection 8 into a second bearing journal 21.

As also seen in FIG. 2, each of the opposing ends 16, 17 of the flange of the T-shaped profile formed by the gap 12 include a journal 22, 23. As shown in FIG. 1, the journals 22, 23 pivotally receive a connecting element 24 which is connected with the second end 25 of the Bowden cable 14. The top side of the connecting element 24 has a recess 26 which pivotally receives the leg 27 of a frame 28 arranged on the support bracket 1. The frame 28 is operatively connected to the support bracket 1. Because the exterior handle of the vehicle door located in the handle recess of the exterior skin of the vehicle door and the associated connecting elements pass through the openings 5, 6 of the support bracket 1 and are therefore connected with the openings 5, 6, the operative connection between the frame 28 and the support bracket 1 also operatively connects the exterior handle of the vehicle door with a frame 28. In this embodiment, the frame 28, which is pivotally received by the connecting element 24, includes journals 29, 30 to provide a pivoting connection with the support bracket 1. The journals 29, 30 are received in bearings 31, 32 disposed in the support bracket.

REFERENCE SYMBOLS

1 support bracket
2 torsion spring
3 ends extending in the longitudinal direction
4 ends extending in the longitudinal direction
5 openings
6 openings
7 openings
8 Bowden cable connection
9 downwardly depending longitudinal side
10 T-shaped profile
11 flange
12 gap
13 ends
14 Bowden cable
15 rib
16 ends
17 ends
18 recesses
19 recesses
20 bearing journal
21 bearing journal
22 pivot
23 pivot
24 connecting element
25 ends
26 recesses
27 leg
28 frame
29 journal
30 journal
31 bearing 32 bearing

The invention claimed is:

1. A support bracket for an exterior handle of a vehicle door for motor vehicles, which is attached on an inside of a outer skin of the vehicle door for mounting the exterior handle, with the exterior handle being positioned in a handle recess of the outer skin of the vehicle door, the support bracket has a torsion spring and a first opening disposed on both longitudinally extending ends for passage of connecting elements of the exterior handle, wherein a second opening for supporting a closing cylinder is arranged following the first opening, and wherein a side of the support bracket facing the second opening optionally includes a support fork enabling a pivoting motion of the exterior handle, the support bracket comprising:

a Bowden cable connection substantially in a region of the second opening that supports the closing cylinder and in a region of the first opening arranged following the second opening and receiving a connecting element of the exterior handle, wherein the Bowden cable connection is releasably connected with a downwardly depending longitudinal side of the support bracket to provide safety in a crash, wherein the support bracket comprises bearing journals extending downwardly from a longitudinal side of the support bracket, each receiving a corresponding recess of the T-shape profile for attaching the Bowden cable connection to the support bracket, wherein the Bowden cable connection formed of a T-shaped profile, with an end of a the Bowden cable being connected with a rib of the T-shaped profile, and with corresponding first and second recesses being disposed on both ends of a flange of the T-shaped profile for attaching the Bowden cable connection to the support bracket.

2. The support bracket according to claim 1, wherein the first and second recesses disposed on the two ends of the flange of the T-shaped profile of the Bowden cable connection are each open on one side to an the-outside and are arranged inside the flange of the T-shaped profile in such a way that the first recess extends at an angle of 90° with respect to a longitudinal direction of the flange of the T-shaped profile, whereas the second recess is oriented in the direction of the flange and is open to an outside on the exterior of the cross-section occupied by one bearing journal of the support bracket in the recess.

3. The support bracket according to claim 1, wherein the Bowden cable connection is attached to the support bracket by a clip-on connection.

4. The support bracket according to claim 3, further comprising:

a gap formed between the flange of the T-shaped profile of the Bowden cable connection and the rib of the T-shaped profile which creates a discontinuity and a height offset, wherein the ends of the flange separated by the gap each include a pivot adapted to pivotally receive a connecting element that connects to a second end of the Bowden cable.

5. The support bracket according to claim 4, wherein the connecting element, which is pivotally connected to the Bowden cable via the pivots, includes on its top side a recess which pivotally receives a leg of a frame wherein the frame is operatively connected with the support bracket and the exterior handle located in the handle recess of the exterior skin of the vehicle door.

6. The support bracket according to claim 5, wherein the frame, which is pivotally received by the connecting element, is pivotally connected with the support bracket via journals and via bearings disposed in the support bracket.

7. The support bracket according to claim 6, further comprising:

a pivoting connection, located between the frame and the support bracket, provided in the region of the first opening used for passage of the connecting elements of the exterior handle, with the second opening used to support the closing cylinder being arranged following the first opening.

8. The support bracket according to claim 7, further comprising:

an additional Bowden cable for establishing an operative connection between the support bracket and/or the closing cylinder, and additional functional elements.

9. The support bracket according to claim 8, wherein the additional Bowden cable can be used to establish an operative connection between the closing cylinder and an interior operating mechanism of a lock.

10. Support bracket according to claim 1, wherein at least the support bracket is made of plastic.

* * * * *